Jan. 27, 1931.  C. H. HACKLÄNDER  1,790,540
ELECTROSCOPIC TESTING DEVICE
Filed July 11, 1925
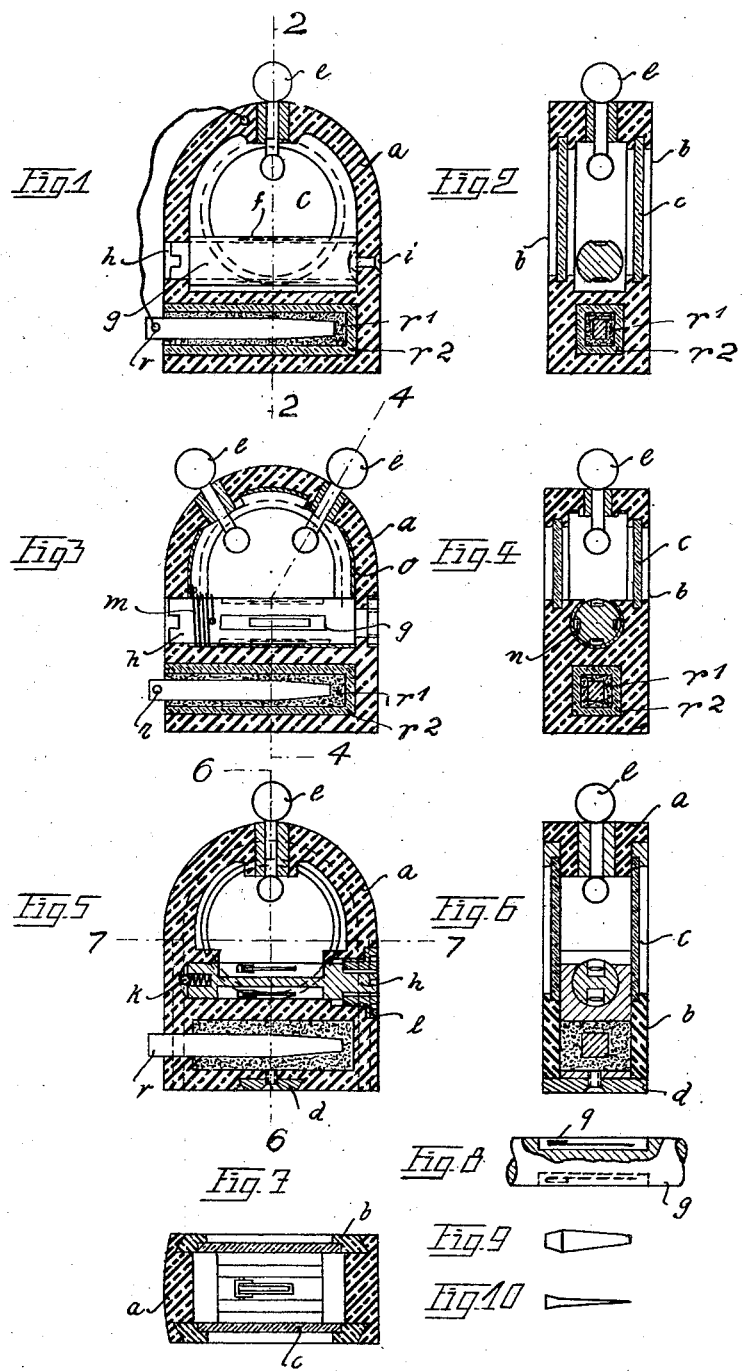
Inventor:
Carl Hermann Hackländer Patented Jan. 27, 1931

1,790,540

UNITED STATES PATENT OFFICE

CARL HERMANN HACKLÄNDER, OF WERMELSKIRCHEN, RHINELAND, GERMANY, ASSIGNOR TO HACKLÄNDER & CO., OF WERMELSKIRCHEN, RHINELAND, GERMANY

ELECTROSCOPIC TESTING DEVICE

Application filed July 11, 1925, Serial No. 43,036, and in Germany July 18, 1924.

The object of the present invention is to produce an electroscope which can be conveniently used for testing in a reliable manner the electric conductivity of textiles and other articles with a view to determine their degree of purity. For a device of this kind to be reliable in its function, it is essential that the casing which encloses the detecting element should be perfectly non-hygroscopic. To attain this end the casing is according to the present invention made of a material which known under the registered trade-mark of "Trolit" and which is a non-conducting and non-hygroscopic cellulose production. Another feature of the invention consists in providing the apparatus with its own charging elements, an arrangement which considerably facilitates its use. A third feature of the invention consists in mounting the metal foil or other detector in a recessed roller which can be turned from the outside for bringing the foil or foils from a protected position into operative position and vice versa.

Fig. 1 of the accompanying drawing represents a sectional view of one form of the apparatus, Fig. 2, a section on the line 2—2 of Fig. 1, Fig. 3, a sectional view of a modified form of the apparatus, Fig. 4, a section on the line 4—4 of Fig. 3, Fig. 5, a sectional view of another modification, Fig. 6, a section on the line 6—6 of Fig. 5, Fig. 7, a section on the line 7—7 of Fig. 5, Fig. 8, a sectional detail view showing the arrangement of the detector foil, and Figs. 9 and 10 are views of modified forms of detecting elements.

In all cases the instrument is composed of an outer casing $a$ made of a material which is known under the registered trade-mark of "Trolit" and which is a non-conducting, non-hygroscopic cellulose production. The casing contains a metal foil $f$ or other movable detecting element adapted to be deflected from its normal position under the attraction produced by a charge of static electricity. To hold such charge, the casing is provided with one or more conductors $e$ arranged with one end inside the casing in the vicinity of the detecting element and with the other end protruding from the casing for the reception of the charge. The ends of the conductor or conductors are preferably enlarged into spheres the inner one of which is smaller than the outer one the better to concentrate the charge near the detector. Apertures covered with windows $c$ of cellon, celluloid, or the like, are made in the side walls $b$ of the casing in order to expose the metal foil to view.

For charging the conductor, a rigid dielectric charging element is arranged in the casing in contact with a padding of felt, fur, leather, cellulose or the like and in such a manner that it can be rubbed against said padding for producing the charge which is subsequently transferred to the conductor. Preferably the charging element consists of a rod $r$ which is normally located in a felt lined recess in the base of the casing, the lining constituting the padding. The rod is electrified by being pulled rapidly out of the casing and is then swept over the conductor for transferring the charge to the latter. The rod is preferably connected by means of a cord of silk or the like to the casing and prevented in this manner from getting lost. Behind the felt lining in the recess, there is an elastic cushion $r^2$ of sponge rubber or the like which presses the lining into good contact with the charging rod.

The metal foil or foils $f$ or other detecting elements are preferably mounted in recesses made in a roller $g$ which is rotatably held in the casing and which has a nicked head $h$ whereby it can be turned from the outside. The roller may be located in a recess in the casing, as shown in Fig. 4, in which case the recess is preferably provided with a metal lining $n$ which is in electric contact with a metal lining $o$ for the inner, arched wall of the casing. The conductor or conductors $e$ are insulated from the lining $o$. In the arrangement shown in Figs. 3 and 4, the roller $g$ is fitted with four circumferentially spaced detecting elements $f$ either of which can be turned into operative position. When the instrument is not in use, the roller $g$ is turned into a position in which all the detecting elements are covered up and protected within the recess. A coil spring arranged above the roller $g$ and secured at one end to the casing $a$ is fitted at its free end with a catch adapted to enter any of a series of recesses in the roller so as to retain the latter with one of the detecting elements $f$ in operative position.

To facilitate the turning of the roller $g$, it may be mounted as shown in Fig. 5 where the inner end of the roller is shown drilled to receive a coil spring whereby it is resiliently supported on a ball $k$. The outer end of the roller is formed with a journal whereby it is rotatively held in a nut $l$ which screws behind the roller into the casing $a$.

If metal foils are employed as detecting elements, it is convenient to attach them at one end to a stiff piece of paper or cardboard $q$ (Fig. 8) which can be clamped in the recess of the roller $g$ so as to hold the foil in position in the latter. A more durable detecting element is obtained from a piece of bent wire which is pivotally held in the roller recess, the fulcrum being adjusted so that the turning moment of the wire is equal to that of the metal foil. The detecting element may, as an alternative, consist of a thin but stiff, tapered metal strip which is supported in the roller recess by means of its widest part so that it can be turned about the latter. Figs. 9 and 10 show different forms of such detecting elements.

Where two conductors are employed in the same instrument, they are preferably arranged at an angle to each other so as to converge towards the detecting element, as shown in Fig. 3.

In order to render the interior of the casing easily accessible, the sides $b$ may be arranged in dovetail grooves, as shown in Fig. 7, so as to be removable from the casing. They may be held in position by a cross slide $d$ (Fig. 5) which is also held in a dovetail groove.

I claim:

1. An electroscope comprising a casing of non-conducting, non-hygroscopic material, a roller supported rotatively in said casing, a detecting element held in a recess in said roller so that it can be deflected from the latter, and a conductor held in the casing with one end outside and the other inside the casing, the inside end being located in the vicinity of the detecting element, the casing being provided with a lined recess for the reception of a charging rod.

2. The structure claimed in claim 1 wherein the roller is mounted in a recess in the casing, and interconnected metal linings for the casing itself and for the roller recess.

3. The structure claimed in claim 1, and a spring catch adapted to hold the roller with the detecting element either in or out of operative position.

4. The structure claimed in claim 1 wherein the detecting element is composed of a strip of metal foil, and a piece of card-board holding one end of the strip, said piece of card-board being adapted to wedge itself in the roller recess.

CARL HERMANN HACKLÄNDER.